Patented Apr. 18, 1939

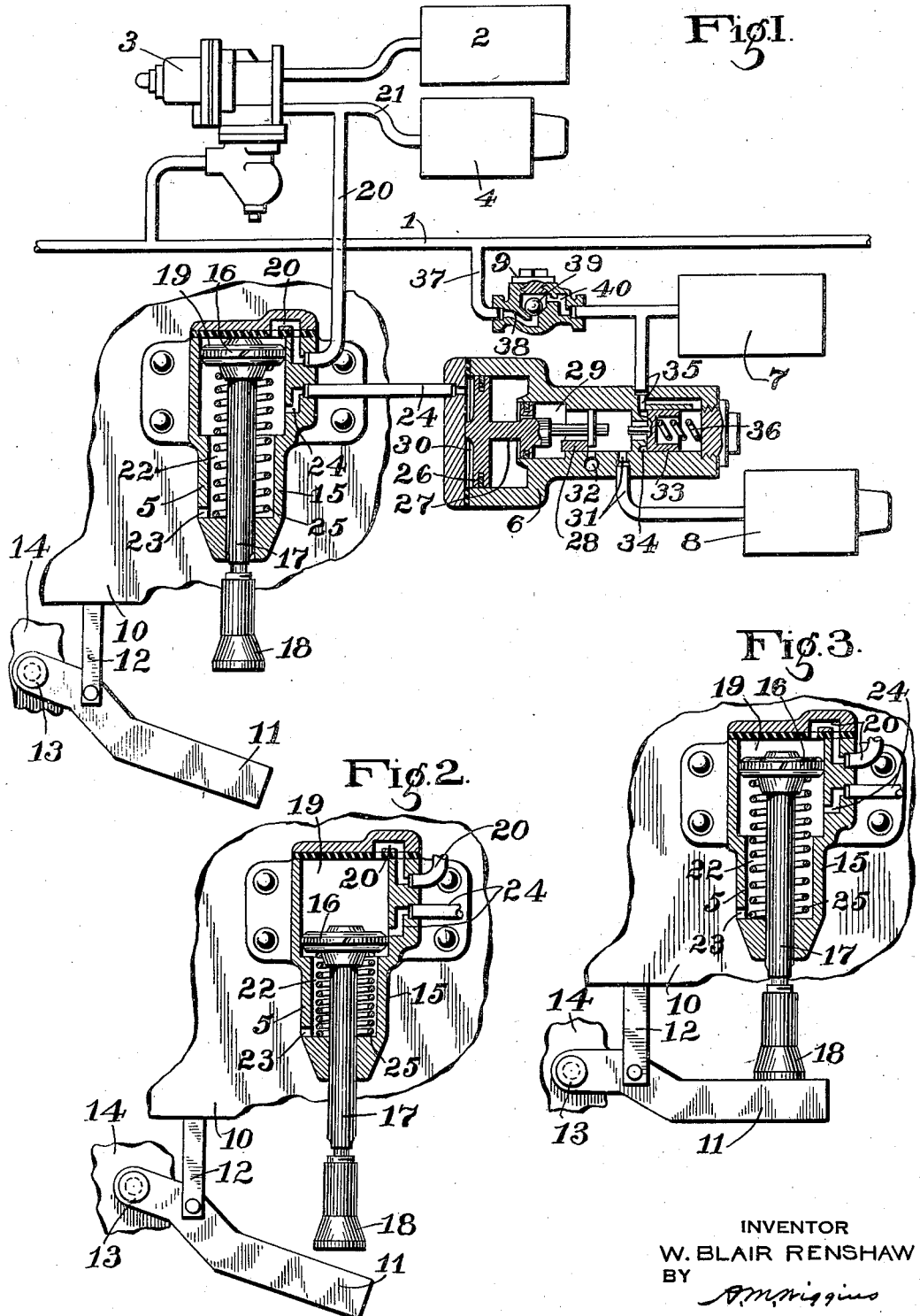

2,155,226

UNITED STATES PATENT OFFICE 2,155,226

EMPTY AND LOAD BRAKE

William Blair Renshaw, East McKeesport, Pa., assignor to The Westinghouse Air Brake Company, Wilmerding, Pa., a corporation of Pennsylvania Application April 23, 1937, Serial No. 138,505

16 Claims. (Cl. 303—22)

This invention relates to empty and load brake equipment for vehicles and more particularly to that type of equipment which is adapted to be automatically conditioned in effecting an application of the brakes for either light or heavy load braking according to the position of the vehicle body or underframe assumes with relation to a fixed part of a truck of the vehicle under a light or heavy load.

The principal object of the invention is to provide an improved and simplified empty and load brake equipment of the above mentioned type.

This object is attained by a provision of both an empty brake cylinder and a load brake cylinder, a brake controlling valve device for controlling the supply of fluid under pressure to and the release of fluid under pressure from the empty brake cylinder, another brake controlling valve device for controlling the supply of fluid under pressure the release of fluid under pressure from the load brake cylinder and a control cylinder mechanism which, when the vehicle is heavily loaded is operative by fluid under pressure supplied to the empty brake cylinder to effect the operation of said other brake controlling valve device to supply fluid under pressure to the load brake cylinder, and which when the vehicle is empty or under light load is ineffective to effect the operation of the brake controlling valve device to supply fluid under pressure to the load brake cylinder.

Another object of the invention is to provide an improved control cylinder mechanism for empty and load fluid pressure brake equipment which comprises a cylinder device for cutting the load braking portion of the equipment either into or out of action and further comprises a lever operative according to movement of the vehicle body relative to a fixed part of the truck of the vehicle for controlling the operation of the control cylinder device.

Other objects and advantages will appear in the following more detailed description of the invention.

In the accompanying drawing Fig. 1 is a diagrammatical view, partly in section, of an empty and load brake equipment embodying the invention, the several parts of the equipment being shown in their release position with the vehicle loaded; Fig. 2 is a fragmentary sectional view of the control cylinder mechanism of the equipment in brake applying position with the vehicle loaded and Fig. 3 is a view similar to Fig. 2 but showing the control cylinder mechanism in brake applying position with the vehicle empty or lightly loaded.

As shown the empty and load brake equipment may comprise a brake pipe 1, an auxiliary reservoir 2, a brake controlling valve device 3, an empty brake cylinder 4, a control cylinder device 5, a load brake controlling valve device 6, a load brake cylinder supply reservoir 7, a load brake cylinder 8, and a combined check valve and choke device 9, all of which parts and devices, in the present embodiment of the invention are carried by the car body or underframe 10.

The equipment also comprises a lever 11 which, as will hereinafter more fully appear, is adapted to control the operation of the control cylinder device 5. This lever intermediate its ends is pivotally mounted on a bracket 12 which is carried by the underframe 10. One end of the lever is pivotally fulcrumed on a projection in the form of a pin or rod 13 which is carried by a fixed part 14 of a truck of the vehicle, the other end of the lever being movable in directions toward and away from the control cylinder device 5.

The brake controlling valve device 3, in the present embodiment of the invention, comprises a triple valve device of the K type and is operative upon a reduction in brake pipe pressure to supply fluid under pressure from the auxiliary reservoir 2 to the empty brake cylinder 4 and is operative upon an increase in brake pipe pressure to vent fluid under pressure from the empty brake cylinder 4 to the atmosphere and to establish communication through which fluid under pressure is supplied from the brake pipe to the auxiliary reservoir. It will here be understood that any other type of brake controlling valve device may be employed so long as it functions to effect an application of the brakes and the release thereof.

The control cylinder device 5 comprises a casing in which there is slidably mounted a reciprocal piston 16 having a stem 17 which extends through a central opening in one end of the casing and which at its outer end has secured thereto a shoe 18 which is adapted to engage the lever 11 when the vehicle is empty or lightly loaded. At one side of the piston 16 is a chamber 19 which is connected through a passage and pipe 20 to the usual brake cylinder pipe 21 leading from the brake controlling valve device 3 to the brake cylinder. At the other side of the piston is a chamber 22 which is connected to the atmosphere through a passage 23 and which is normally connected to a passage and pipe 24 leading to the load brake cylinder control valve device 6. Contained in the chamber 22 and interposed between and operatively engaging the piston 16 and the casing is a spring 25 which is adapted to normally maintain the piston in the position in which it is shown in Fig. 1.

The load brake cylinder control valve device 6 may comprise a casing in which there is slidably mounted a reciprocal piston 26 having a stem 27 adapted to operate a slide valve 28 contained in a chamber 29 at one side of the piston. At the other side of the piston is a chamber 30 which is connected to the pipe 24 leading to the control piston device 5. The valve chamber 29 is in constant open communication through passage and pipe 31 with the load brake cylinder 8 and, with the slide valve 28 in release position as shown in Fig. 1, is connected to the atmosphere through a passage 32. The piston stem 27 is adapted to engage and operate a supply valve piston 33 contained in a chamber 34 which is connected through a passage and pipe 35 to the load reservoir 7, which valve piston controls communication between the chambers 29 and 34 and through the action of a spring 36 is normally maintained in the position in which it is shown in Fig. 1 to close the communication.

The brake pipe 1 is connected to the load reservoir 7 by way of a branch pipe 37, a passage 38 in the casing of the check valve device 9 past a ball check valve 39 and through a restricted passage 40 and pipe 35.

Initially charging the equipment

In initially charging the equipment fluid under pressure is supplied to the brake pipe in the usual manner and flows through the brake controlling valve device 3 to the auxiliary reservoir 2 and also flows through pipe 37, passage 38 past the ball check valve 39 and through passages 40 and pipe 35 to the load reservoir 7, so that the reservoirs 2 and 7 are charged to brake pipe pressure.

With the equipment in release position as shown in Fig. 1, the empty brake cylinder 4 is connected to the atmosphere by way of the brake controlling valve device 3 in the usual manner and the load brake cylinder 8 is connected to the atmosphere by way of pipe and passage 31, slide valve chamber 29 of the load brake controlling valve device 6 and passage 32. The piston chamber 30 of the load brake controlling valve device 6 is connected through pipe and passage 24, chamber 22 and passage 23 with the atmosphere.

Application of the brakes with the vehicle empty or lightly loaded

When the vehicle is empty or lightly loaded the lever 11 will be in the position in which it is shown in Fig. 3. Now when a reduction in brake pipe pressure is effected the brake controlling valve device 3 operates to supply fluid under pressure from the auxiliary reservoir 2 to the empty brake cylinder 4 by way of pipe 21 and since this pipe is connected to pipe 20, fluid under pressure also flows to the piston chamber 19 of the control cylinder device 5 causing the piston 16, acting through the medium of the piston stem 17, to move the shoe 18 into engagement with the lever 11. Since the lever is rigidly held in position by both the car body and truck the piston will be brought to a stop before it can uncover the passage 24. With the piston in this position, it will be seen that the load brake controlling valve device 6 remains in release position so that the application of the brake is controlled by the brake controlling valve device 3 and empty brake cylinder 4.

It will here be noted that when the brake pipe pressure is reduced to effect an application of the brakes the ball check valve 39 of the check valve device 9 prevents back flow of fluid from the fully charged load reservoir 7 to the brake pipe.

Release of the brakes with the vehicle empty or lightly loaded

When it is desired to effect a release of the brakes the brake pipe pressure is increased in the usual manner which causes the brake controlling valve device 3 to operate to vent fluid under pressure from the empty brake cylinder 4 to the atmosphere and to establish communication through which the auxiliary reservoir 2 is recharged with fluid under pressure.

Since the piston chamber 19 of the control piston device 5 is connected to the empty brake cylinder pipe 21, fluid under pressure is vented from the chamber 19 with the fluid being vented from the empty brake cylinder 4. Now when the pressure of fluid in the empty brake cylinder 4 and consequently in piston chamber 19 is reduced to a low degree, the spring 25 of the control cylinder device 5 acts to move the piston 16 and thereby the shoe 18 from the position in which they are shown in Fig. 3 to the position in which they are shown in Fig. 1, so that the shoe will be out of engagement with the lever 11, the clear space between the shoe and lever being great enough to prevent the engagement between the lever and shoe when the vehicle body or underframe moves vertically relative to the truck under ordinary conditions of service.

Application of the brakes with the car heavily loaded

As the vehicle is being loaded the body thereof will move downwardly relative to the truck frame or other fixed part of the truck, and as it thus moves, will permit the lever 11 to rock downwardly in a clockwise direction about the fixed fulcrum pin 13 and when the vehicle is heavily loaded will assume the position in which it is shown in Figs. 1 and 2. Now when the brake pipe pressure is reduced and the brake controlling valve device 3 operates to supply fluid under pressure from the auxiliary reservoir 2 to the empty brake cylinder 4 and piston chamber 19 of the control cylinder device 5, the piston 16 will be moved from the position in which it is shown in Fig. 1 to the position in which it is shown in Fig. 2, the piston in its traverse first closing communication from the passage 24 to the chamber 22 and then establishing communication from the chamber 19 to this passage. With this latter communication established fluid at empty brake cylinder pressure flows from chamber 19 through passage and pipe 24 to the piston chamber 30 of the load brake controlling valve device 6 causing the piston 26 and thereby the piston stem 27 and slide valve 28 to be moved to their extreme right-hand position as viewed in Fig. 1, the slide valve 38 first lapping the passage 31 to cut off communication from the valve chamber 29 to the atmosphere and then the piston engaging and moving the supply valve to its open position against the opposing pressure of the spring 36. With the supply valve in this position, fluid under pressure now flows from the load reservoir 7 to the load brake cylinder 8 by way of pipe and passage 35, chamber 34, chamber 29 and passage and pipe 31. It will be noted that when the piston 16 of the control cylinder device 5 is in its load position as shown in Fig. 2 the shoe 18 carried by the piston stem will not engage the lever 11, there being sufficient clear space between the lever and shoe to compensate for slight vertical movements of the vehicle body or under frame relative to the truck due to track conditions.

When the pressure of fluid in the load brake cylinder and consequently in the valve chamber 29 of the valve device 6 is substantially equal to empty brake cylinder pressure in chamber 30 the spring 36 acts to seat the valve piston 33 and thereby cut off the supply of fluid under pressure from the reservoir 7 to the load brake cylinder, thus the pressure of fluid in the load brake cylinder will be substantially the same as that in the empty brake cylinder.

*Release of the brakes with the vehicle heavily loaded*

When, in releasing the brakes fluid under pressure is being vented from the empty brake cylinder 4 and piston chamber 19 of the control piston device 5, the spring 25, which has been compressed, causes the piston 16 to move upwardly. This piston as it is thus moved first connects the passage 24 and thereby the piston chamber 29 of the load brake controlling valve device 26 to chamber 22 and then continues to move toward its normal position as shown in Fig. 1. Since the chamber 22 is connected through passage 23 to the atmosphere fluid under pressure from the piston chamber 29 is vented to the atmosphere so that fluid at load brake cylinder pressure present in chamber 29 causes the piston and thereby the piston stem 27 and slide valve 28 to move to their release positions as shown in Fig. 1. As the piston stem 27 is thus moved it permits the spring 36 to act to close the supply piston valve 33 after which the stem moves the slide valve 28 clear of the atmospheric passage 32. With the slide valve in this position fluid under pressure is vented from the load brake cylinder 8 to the atmosphere by way of pipe and passage 31, slide valve chamber 29 and passage 32, the flow of fluid from the load reservoir being at a faster rate than fluid under pressure is being vented from the empty brake cylinder through the usual restricted exhaust communication leading from the brake controlling valve device 3 so as to insure the disengagement of the usual latch mechanism before the piston of the empty brake cylinder moves to release position. All of which is for the purpose of preventing the empty brake cylinder from damaging the latch mechanism.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In combination, a vehicle having a fixed part and a part movable relative to said fixed part according to the load on the vehicle, an empty and load brake equipment for the vehicle comprising a control mechanism having a control position for providing empty braking and having another control position for providing load braking, said mechanism being adapted to be moved by fluid under pressure from the empty braking control position to the load braking control position and means connected to both said fixed and movable parts of the vehicle and operative according to movement of the movable part relative to the fixed part for controlling the positioning of said control mechanism.

2. In combination, a vehicle having a fixed part and a part movable relative to said fixed part according to the load on the vehicle, an empty and load brake equipment for the vehicle comprising a control mechanism having a control position for providing empty braking and having another control position for providing load braking, said mechanism being adapted to be moved by fluid under pressure from the empty braking control positions to the load braking control position, and a member carried by said fixed part and positioned by said movable part upon movement of said movable part relative to said fixed part for controlling the positioning of said control mechanism.

3. In combination, a vehicle having a fixed part and a part movable relative to said fixed part according to the load on the vehicle, an empty and load brake equipment for the vehicle comprising a control mechanism having a control position for providing empty braking and having another control position for providing load braking, said mechanism being adapted to be moved by fluid under pressure from the empty braking control positions to the load braking control position, and means connected to said fixed and movable parts of the vehicle and operative according to movement of the movable part relative to the fixed part for controlling the positioning of said control mechanism, said means in the position it assumes under light load being adapted to prevent the control mechanism from being moved to load position, and in the position it assumes under heavy load being adapted to permit movement of the control mechanism to load position.

4. In combination, a vehicle having a fixed part and a part movable relative to said fixed part according to the load on the vehicle, an empty and load brake equipment for the vehicle comprising a control mechanism having a control position for providing empty braking and having another control position for providing load braking, said mechanism being adapted to be automatically moved from one of said control positions to the other, and means connected to said fixed and movable parts of the vehicle and operative according to movement of the movable part relative to the fixed part for controlling the positioning of said control mechanism, said means in the position it assumes under light load being adapted to prevent the control mechanism from being moved to load position, and in the position it assumes under heavy load being adapted to permit movement of the control mechanism to load position and to clear the control mechanism while the control mechanism is in load position.

5. In combination, a vehicle having a fixed part and a part movable relative to said fixed part according to the load on the vehicle, an empty and load brake equipment for the vehicle comprising a control mechanism having a control position for providing empty braking and having another control position for providing load braking, said mechanism being adapted to be moved by fluid under pressure from the empty braking control positions to the load braking control position upon the initiation of an application of the brakes, and means connected to said fixed and movable parts and operative into or out of the zone of travel of said control mechanism according to movement of the movable part relative to the fixed part for controlling the positioning of the control mechanism, said means, when in the zone of travel of the control mechanism, maintaining the control mechanism in empty braking control position and when out of the zone of travel permitting movement of the control mechanism to load braking control position.

6. In combination, a vehicle having a fixed part and a part movable relative to said fixed part according to the load on the vehicle, an empty an load brake equipment for the vehicle comprising a control mechanism having a control position for providing empty braking and having another control position for providing load braking, said control mechanism being adapted to be automatically moved from empty braking control position to load braking control position upon the initiation of an application of the brakes, and means adapted to maintain said control mechanism in empty brake position when the vehicle is lightly loaded and operative by said movable parts upon movement of the movable part relative to the fixed part when the vehicle is being heavily loaded for permitting the control mechanism to move to load braking control position.

7. The combination with a vehicle comprising a truck having a fixed part and a body movable vertically relative to said fixed part, of an empty and load brake equipment for the vehicle including a control mechanism having a control position for providing empty braking and having a different control position for providing load braking, said control mechanism being adapted to be automatically moved from the empty braking control position to the load braking control position upon the initiation of an application of the brakes, and means having an empty braking position adapted to maintain said control mechanism in empty braking control position when the vehicle is lightly loaded and having a load braking position to which it is adapted to be moved when the vehicle is being heavily loaded so as to render it ineffective to maintain the control mechanism in empty braking control position.

8. The combination with a vehicle having a fixed part and a part movable relative to said fixed part, of an empty and load brake equipment for the vehicle comprising an empty brake cylinder, a load brake cylinder, a brake controlling valve device operative to control the empty brake cylinder pressure, a control valve device operative by fluid under pressure to control the load brake cylinder pressure, means adapted to be controlled by fluid at empty brake cylinder pressure for controlling the operation of said control valve device, and a mechanism controlled according to movement of said movable part relative to the fixed part for rendering said means either effective or ineffective to control the operation of the control valve device.

9. The combination with a vehicle having a fixed part and a part movable relative to said fixed part, of an empty and load brake equipment for the vehicle comprising an empty braking portion, a load braking portion, change-over means adapted to be operated upon the initiation of the operation of the empty braking portion for effecting the operation of the load braking portion, and stop means adapted to be positioned in or out of the zone of travel of the change-over means according to movement of the movable part relative to the fixed part for rendering said change-over means either effective or ineffective to cut the load braking portion into operation.

10. The combination with a vehicle having a fixed part and a part movable relative to said fixed part, of an empty and load brake equipment for the vehicle comprising an empty braking portion operative in effecting either an empty or a load application of the brakes, a load braking portion operative only in effecting a load application of the brakes, change-over means adapted to be moved upon the initiation of the operation of the empty braking portion for effecting the operation of the load braking portion, and stop means adapted to be moved into the zone of travel of the change-over means to render the change-over means ineffective to cut the load braking portion into operation when the vehicle is lightly loaded and adapted to be moved out of the zone of travel of the change-over means to render the change-over means effective to cut the load braking portion into operation when the vehicle is heavily loaded.

11. The combination with a vehicle having a fixed part and a part movable relative to the fixed part according to load conditions on the vehicle, of an empty and load fluid pressure brake equipment for the vehicle, said empty and load brake equipment comprising an empty brake cylinder, a brake controlling valve device normally connecting the empty brake cylinder to the atmosphere and operative to supply fluid under pressure to the empty brake cylinder to effect an application of the brakes, a load brake cylinder, a valve device normally connecting the load brake cylinder to the atmosphere and operative by fluid under pressure supplied to a control chamber therein to supply fluid under pressure to the load brake cylinder to effect an application of the brakes, means normally connecting said control chamber to the atmosphere and adapted to be operated by fluid under pressure supplied to the empty brake cylinder in effecting an application of the brakes to first cut off the connection from said control chamber to the atmosphere and to then establish communication through which fluid under pressure at empty brake cylinder pressure flows to said control chamber to effect the operation of said valve device to supply fluid under pressure to the load brake cylinder, and means positioned according to the position of said movable part with relation to the fixed part for either maintaining said means in position connecting control chamber to the atmosphere or permitting said means to move to establish communication through which fluid under pressure flows to said chamber.

12. The combination with a vehicle having a fixed part and a part movable relative to the fixed part according to load conditions on the vehicle, of an empty and load fluid pressure brake equipment for the vehicle, said empty and load brake equipment comprising an empty brake cylinder, a brake controlling valve device normally connecting the empty brake cylinder to the atmosphere and operative to supply fluid under pressure to the empty brake cylinder to effect an application of the brakes, a load brake cylinder, a valve device normally connecting the load brake cylinder to the atmosphere and operative by fluid under pressure supplied to a control chamber therein to supply fluid under pressure to the load brake cylinder to effect an application of the brakes, means normally connecting said control chamber to the atmosphere and adapted to be operated by fluid under pressure supplied to the empty brake cylinder in effecting an application of the brakes to first cut off the connection from said control chamber to the atmosphere and to then establish communication through which fluid under pressure at empty brake cylinder pressure flows to said control chamber to effect the operation of said valve device to supply fluid under pressure to the load brake cylinder, and means positioned according to the position of said movable part with relation to the fixed part for either maintaining said means in position connecting control chamber to the atmosphere or permitting said means to move to establish communication through which fluid under pressure flows to said chamber, said means being automatically operated upon a reduction in empty brake cylinder pressure in effecting the release of the brakes to vent fluid under pressure from said control chamber to effect the operation of said valve device to vent fluid under pressure from the load brake cylinder.

13. The combination with a vehicle having a fixed part and a part movable relative to the fixed part according to load conditions on the vehicle, of an empty and load fluid pressure brake equipment for the vehicle, said empty and load brake equipment comprising an empty brake cylinder, a brake controlling valve device normally connecting the empty brake cylinder to the atmosphere and operative to supply fluid under pressure to the empty brake cylinder to effect an application of the brakes, a load brake cylinder, a valve device normally connecting the load brake cylinder to the atmosphere and operative by fluid under pressure supplied to a control chamber therein to supply fluid under pressure to the load brake cylinder to effect an application of the brakes, means normally connecting said control chamber to the atmosphere and adapted to be operated by fluid under pressure supplied to the empty brake cylinder in effecting an application of the brakes to first cut off the connection from said control chamber to the atmosphere and to then establish communication through which fluid under pressure at empty brake cylinder pressure flows to said control chamber to effect the operation of said valve device to supply fluid under presure to the load brake cylinder, and means positioned according to the position of said movable part with relation to the fixed part for either maintaining said means in position connecting control chamber to the atmosphere or permitting said means to move to establish communication through which fluid under pressure flows to said chamber, said valve device being operative automatically when the load brake cylinder is substantially equal to the control chamber pressure for cutting off the supply of fluid under presure to the load brake cylinder.

14. The combination with a vehicle having a fixed part and a part movable relative to the fixed part according to load conditions on the vehicle, of an empty and load flid pressure brake equipment for the vehicle, said empty and load brake equipment comprising an empty brake cylinder, a brake controlling valve device normally connecting the empty brake cylinder to the atmosphere and operative to supply fluid under pressure to the empty brake cylinder to effect an application of the brakes, a load brake cylinder, a valve device normally connecting the load brake cylinder to the atmosphere and operative by fluid under pressure supplied to a control chamber therein to supply fluid under pressure to the load brake cylinder to effect an application of the brakes, means normally connecting said control chamber to the atmosphere and adapted to be operated by fluid under pressure supplied to the empty brake cylinder in effecting an application of the brakes to first cut off the connection from said control chamber to the atmosphere and to then establish communication through which fluid under pressure at empty brake cylinder pressure flows to said control chamber to effect the operation of said valve device to supply fluid under pressure to the load brake cylinder, and means positioned according to the position of said movable part with relation to the fixed part for either maintaining said means in position connecting control chamber to the atmosphere or permitting said means to move to establish communication through which fluid under pressure flows to said chamber, and mechanism adapted when the vehicle is lightly loaded for maintaining said means in a position to maintain said control chamber vented and operative when the vehicle is being heavily loaded to permit said means to operate to establish communication through which fluid under pressure flows to said control chamber.

15. The combination with a vehicle having a fixed part and a part movable relative to the fixed part according to load conditions on the vehicle, of an empty and load fluid pressure brake equipment for the vehicle, said empty and load brake equipment comprising an empty brake cylinder, a brake controlling valve device normally connecting the empty brake cylinder to the atmosphere and operative to supply fluid under pressure to the empty brake cylinder to effect an application of the brakes, a load brake cylinder, a valve device normally connecting the load brake cylinder to the atmosphere and operative by fluid under pressure supplied to a control chamber therein to supply fluid under pressure to the load brake cylinder to effect an application of the brakes, means normally connecting said control chamber to the atmosphere and adapted to be operated by fluid under pressure supplied to the empty brake cylinder in effecting an application of the brakes to first cut off the connection from said control chamber to the atmosphere and to then establish communication through which fluid under pressure at empty brake cylinder pressure flows to said control chamber to effect the operation of said valve device to supply fluid under pressure to the load brake cylinder, and means positioned according to the position of said movable part with relation to the fixed part for either maintaining said means in position connecting control chamber to the atmosphere or permitting said means to move to establish communication through which fluid under pressure flows to said chamber, said means when the vehicle is lightly loaded being normally spaced away from said mechanism and when the vehicle is heavily loaded and in position establishing communication through which fluid under pressure flows to said control chamber being spaced away from said mechanism.

16. The combination with a vehicle having a fixed part and a part movable relative to the fixed part according to load conditions on the vehicle, of an empty and load fluid pressure brake equipment for the vehicle, said empty and load brake equipment comprising an empty brake cylinder, a brake controlling valve device normally connecting the empty brake cylinder to the atmosphere and operative to supply fluid under pressure to the empty brake cylinder to effect an application of the brakes, a load brake cylinder, a valve device normally connecting the load brake cylinder to the atmosphere and operative by fluid under pressure supplied to a control chamber therein to supply fluid under pressure to the load brake cylinder to effect an application of the brakes, means normally connecting said control chamber to the atmosphere and adapted to be operated by fluid under pressure supplied to the empty brake cylinder in effecting an application of the brakes to first cut off the connection from said control chamber to the atmosphere and to then establish communication through which fluid under pressure at empty brake cylinder pressure flows to said control chamber to effect the operation of said valve device to supply fluid under pressure to the load brake cylinder, means positioned according to the position of said movable part with relation to the fixed part for either maintaining said means in position connecting control chamber to the atmosphere or permitting said means to move to establish communication through which fluid under pressure flows to said chamber, and a spring normally maintaining said means out of contact with said mechanism.

W. BLAIR RENSHAW.